United States Patent
Paleologou et al.

(10) Patent No.: US 11,802,183 B2
(45) Date of Patent: Oct. 31, 2023

(54) LIGNIN DEPOLYMERIZATION PROCESS USING CHEMICALS RECOVERABLE BY THE KRAFT RECOVERY CYCLE

(71) Applicant: FPInnovations, Pointe-Claire (CA)

(72) Inventors: Michael Paleologou, Beaconsfield (CA); Zaid Ahmad, Mississauga (CA); Chunbao Xu, London (CA)

(73) Assignee: FPInnovations, Pointe-Claire (CA)

( * ) Notice: Subject to any disclaimer, the term of this patent is extended or adjusted under 35 U.S.C. 154(b) by 0 days.

(21) Appl. No.: 16/611,668

(22) PCT Filed: May 8, 2018

(86) PCT No.: PCT/CA2018/050547
§ 371 (c)(1),
(2) Date: Nov. 7, 2019

(87) PCT Pub. No.: WO2018/205021
PCT Pub. Date: Nov. 15, 2018

(65) Prior Publication Data
US 2020/0148835 A1    May 14, 2020

Related U.S. Application Data (60) Provisional application No. 62/503,376, filed on May 9, 2017.

(51) Int. Cl.
*C08H 7/00* (2011.01)
*C08J 11/16* (2006.01)

(52) U.S. Cl.
CPC .............. *C08H 6/00* (2013.01); *C08J 11/16* (2013.01); *C08J 2397/02* (2013.01)

(58) Field of Classification Search
CPC ..... C08H 6/00; C08H 8/00; C07G 1/00; C08J 2397/02; C08J 11/16
See application file for complete search history.

(56) References Cited

U.S. PATENT DOCUMENTS 5,959,167 A * 9/1999 Shabtai .................. C10G 47/12
585/242
6,420,533 B1 * 7/2002 Lightner ................. C08H 6/00
210/194

(Continued)

FOREIGN PATENT DOCUMENTS

CA    2804186    1/2012
CA    2998574    3/2017

(Continued)

OTHER PUBLICATIONS

Javier Fernandez-Rodriguez et al., "Small Phenolic Compounds Production from Kraft Black Liquor by Lignin Depolymerization with Different Catalytic Agents," 57 Chemical Engineering Transactions 133-138, published Mar. 20, 2017. (Year: 2017).*

(Continued)

*Primary Examiner* — Liam J Heincer
(74) *Attorney, Agent, or Firm* — NORTON ROSE FULBRIGHT CANADA LLP (57) ABSTRACT

The present relates to a process for the depolymerization of lignin using chemicals recoverable by the soda or kraft mill recovery cycles. The process involves the use of sodium hydroxide or white liquor to depolymerize lignin in black liquor or other lignins (e.g. hydrolysis lignin, kraft lignin) by conducting the reaction at 170-250° C. for up to 3 hours in the presence or absence of a co-solvent and a capping agent. The depolymerized lignin is then obtained by acidifying the reaction products to a low pH to precipitate the de-polymerized lignin, followed by particle coagulation, cake filtration and washing with acid and water to obtain a purified depolymerized lignin product.

15 Claims, 7 Drawing Sheets

(56) References Cited

U.S. PATENT DOCUMENTS

| | | | |
|---|---|---|---|
| 9,567,360 B2 | 2/2017 | Hannus et al. | |
| 2013/0060071 A1* | 3/2013 | Delledonne | C07C 37/54 |
| | | | 585/310 |
| 2013/0131326 A1* | 5/2013 | Hannus | C07G 1/00 |
| | | | 530/500 |
| 2013/0232855 A1 | 9/2013 | Peterson et al. | |
| 2016/0130752 A1* | 5/2016 | Stigsson | C08H 6/00 |
| | | | 162/16 |
| 2016/0184796 A1* | 6/2016 | Powell | B01D 3/143 |
| | | | 422/187 |

FOREIGN PATENT DOCUMENTS

| | | | |
|---|---|---|---|
| WO | 20141923289 | 12/2014 | |
| WO | WO-2014193289 A1 * | 12/2014 | C02F 1/442 |
| WO | WO-2017048164 A1 * | 3/2017 | C08H 8/00 |

OTHER PUBLICATIONS

Mahmood et al. "Hydrolic depolymerization of hydrolysis lignin: Effects of catalysts and solvents", Bioresource Technology, 190, 2015, 416-419.

Xinping et al. "Effect of solvent on hydrothermal oxidation deplymerization of lignin for the production of monophenolic compounds", Fuel Processing Technology, 144, Apr. 2016, 181-185.

Ma et al. "Reactivity imporvement of cellulolytic enzyme lignin via mild hydrothermal modification", Bioorganic Chemistry, 75, 2017, 173-180.

Saisu et al. "Conversion of Lignin with Supercritical Water-Phenol Mixtures", Energy & Fuels, 2003, 17, 922-928.

\* cited by examiner

PRIOR ART

Fig. 1

PRIOR ART

LIGNIN DEPOLYMERIZATION PROCESS USING CHEMICALS RECOVERABLE BY THE KRAFT RECOVERY CYCLE

CROSS-REFERENCE TO RELATED APPLICATIONS

The present application is a U.S. National Phase of International Application No. PCT/CA2018/050547, filed on May 8 2018, and claims benefit of U.S. Provisional Application No. 62/503,376 filed May 9, 2017, the content of which are hereby incorporated by reference in their entirety.

TECHNICAL FIELD

The present relates to a cost-effective process of depolymerizing lignin using chemicals that are recoverable by the kraft recovery cycle.

BACKGROUND ART

The production of bio-based chemicals/fuels/materials from forest resources is a major component of the international renewable energy technology efforts. To date, most research efforts have focused on the utilization of the cellulose and hemicellulose components of biomass. However, lignin constitutes approximately 30% of the dry weight of softwoods and about 20% of the hardwoods.

Even though, lignin represents a rich potential source of organic macromolecules that can serve as a precursor for aromatics and their derivatives, it still remains an underutilized valuable by-product of past and current biomass conversion technologies due to a lack of technically sound and cost-effective routes for lignin utilization.

Lignin is generated industrially in large quantities especially from the kraft pulping process in the form of "black liquor". Black liquor is the major residual stream from the kraft pulping process, containing 30-35 wt. % lignin. According to the International Lignin Institute, about 40-50 million tons of kraft lignin (KL) is generated worldwide each year in the form of "black liquor". While combustion of black liquor to regenerate pulping chemicals and to produce steam and power is an integral part of the kraft process, a small portion of the lignin can be removed without compromising mill material and energy balances. 60-70% of North American Kraft mills experience production bottlenecks due to the thermal capacity of their recovery boilers. A moderate-capital solution to this problem, is to precipitate some portion of kraft lignin from the black liquor, which would increase incremental pulp production and provide an additional revenue stream from sale of the isolated kraft lignin. While currently worldwide 1-1.5 million tons/year of lignin is utilized for a wide range of applications, almost all of this is lignosulfonates from sulfite pulping. Lignosulfonates are water-soluble, highly sulfonated substances, quite different from kraft lignin. Until recently, the only commercial source of kraft lignin has been from Mead-Westvaco (now called Ingevity), which produces approximately 20,000 metric tons/year of kraft lignin under the trade name Indulin™ from a plant in South Carolina.

Hydrolysis lignin (HL) is a byproduct from acid or enzymatic biomass pretreatment processes such as the ones employed in cellulosic sugar and/or ethanol plants. HL could be, for example, the solid residue (WO 2011/057413) from the enzymatic hydrolysis of woody biomass which is mainly composed of lignin (50-65 wt. %), unreacted cellulose and mono and oligosaccharides. Extensive research was undertaken in the former Soviet Union to find uses for acid hydrolysis lignins as they had several wood hydrolysis plants (Rabinovich, M. L, Wood hydrolysis industry in the Soviet Union and Russia, a mini-review, Cellulose Chem. Technol. 44(4-6), 173-186 (2010). Several chemical modifications of HL were carried out at the time to make effective uses of this abundantly available phenolic rich polymer, however, the majority of the HL was disposed of because the required modifications were either too expensive or the material did not function well enough in application. Similar problems are faced by researchers today in developing effective uses of HL.

There exist many challenges in utilizing lignins for chemicals or materials, mainly due to their poor reactivity and compatibility with other materials, both related to their large molecular weight. Thus, enormous research efforts have been made in developing technologies for depolymerization of lignin and utilization of depolymerized products with lower molecular weight and hence improved reactivity for the production of valuable biomaterials such as lignin-based polyurethane (PU) foams, phenolic resins/foams and epoxy resins.

Lignin is a branched phenolic natural biopolymer primarily composed of three phenylpropanoid building units: p-hydroxyphenylpropane, guaiacylpropane, and syringylpropane interconnected by etheric and carbon-to-carbon linkages. Generally, in unprocessed lignin, two thirds or more of these linkages are ether bonds, while the remaining linkages are carbon-carbon bonds. Different types of lignin vary significantly in the ratio between these monomers. Various lignin depolymerization processes (via hydrolytic, reductive or oxidative routes) were reported in the literature. Nguyen et al. (2014, Journal of Supercritical Fluids, 86: 67-75) reported a high-pressure pilot process for the hydrolytic conversion of KL into bio-oils and chemicals in near critical water (350° C., 25 MPa), employing a fixed-bed catalytic reactor filled with $ZrO_2$ pellets, while the lignin was dispersed in an aqueous solution containing $K_2CO_3$ (catalyst) and phenol (co-solvent). However, the system was complex and operated at high pressure, hence usually not preferred for industrial applications. Mahmood et al., (2013, Bioresource Technology, 139: 13-20) achieved the depolymerization of KL via hydrolysis, using water alone as the solvent, in alkaline medium using NaOH as a catalyst. The process itself was very effective for achieving good quality DKL. However, the $M_w$ of the DKL was >5000 g/mole from the operations at 250° C., 45 min and 20 wt. % KL concentration. The $M_w$ of the DKL could be reduced to ~1500 g/mole from the operations at 350° C. or at 250° C. and 2 h with 10 wt. % KL concentration. However, the reactor pressure varied from 5 MPa to 16 MPa with the increase in temperature from 250° C. to 350° C. Therefore, the operating pressure of the process was very high. In other research work, Yuan et al. (2010, Bioresource Technology, 101: 9308-9313) also achieved a successful depolymerization of KL into oligomers in hot-compressed water-ethanol medium with NaOH as the catalyst and phenol as a capping agent. Similarly, the lignin depolymerization process was complex and the pressure of the reactor system was very high.

So far, kraft lignin (KL) has been de-polymerized into oligomers and monomers via hydrolytic depolymerization (using water) or reductive depolymerization (using hydrogen) in various solvents and catalysts. The most commonly used solvents include water, water-ethanol co-solvent, water-ethanol-formic acid, methanol, and acetone, etc. Also a range of various homogeneous, heterogenous, metallic, commercial and industrial catalysts have been tested for the depolymerization of lignin. However, all the depolymerization processes operate at high temperature and pressure (as high as 8-12 MPa) reaction conditions. The high temperature-pressure processes are associated with high capital/operating costs and more challenges in large-scale industrial applications.

Polyurethanes (PUs) are usually made through the reaction of polyols with isocyanates. Polyols are chemical compounds with multiple hydroxyl groups in their structures. A wide range of polyols are available as feedstock in polyurethane production. Polyols can be aromatic or aliphatic. The most commonly used polyols are polyethers, polyesters and acrylic polyols. The critical factors for polyols regarding the performance of the final polyurethane product are molecular weight, structure and functionality/hydroxyl number. Polyether and polyester are two major kinds of polyols consumed in the global polyol market. In 1994, nearly 90% of 1.8 million metric tons of polyurethanes consumed in the United States were based on polyethers, 9% on polyesters and 1% on other specialty polyols. Currently, both the polyisocyanates and polyols are derived from petroleum resources. PUs have rapidly grown to be one of the most widely used synthetic polymers with a continuously increasing global market in varied applications in different areas, including liquid coatings and paints, adhesives, tough elastomers, rigid foams, flexible foams, and fibers. Rigid PU foam is a highly cross-linked polymer with a closed cell structure. These materials offer low density, low thermal conductivity, low moisture permeability, high dimensional stability and strength leading to a wide range of applications in construction, refrigeration appliances, and technical insulations.

Phenol formaldehyde (PF) resins are the most commonly used resins in engineered wood applications as adhesives following urea formaldehyde (UF) resins, and are in high demand in the manufacture of softwood plywood for exterior building and construction purposes. Application of resoles as wood adhesives is very common especially in the manufacture of particleboard, plywood and OSB. Resoles are preferred for wood adhesives because of their ability to form three-dimensional networks that have favorably high tensile strength, high modulus, dimensional stability, and resistance to moisture. Around 95% of the phenol used in the production of PF resins is derived from petroleum products.

The properties of phenolic resins can be tailored to foamable phenolic resins/resoles for their further utilization in the preparation of phenolic foams. Phenolic foams are the mixtures of foamable phenolic resin, a blowing agent, a surfactant, and optional additives. Rigid closed cell phenolic foams show low thermal conductivity and exceptional flame-retardant properties, including low flammability with no dripping during combustion, low smoke and toxicity. The PF foams can be utilized as fire-resistant, thermal insulation materials in applications such as civil construction, military aircraft and marine vessels. Moreover, the inherent chemical-resistant property of phenolic foam makes it outstanding in fields where chemical resistance is critical.

Epoxy resins, are another type of resin, also known as polyepoxides. They are a class of reactive prepolymers and polymers which contain epoxide groups. Epoxy resins are one of the most versatile materials due to their unique properties such as good chemical resistance, high moisture and solvent resistance, good thermal and dimensional stability, high adhesion strength and superior electrical properties. These properties provide diverse applications of epoxy resins, in such fields as high performance composites, industrial coatings, adhesives, electrical-electronic laminates, flooring and paving applications, etc. Epoxy resins are currently produced dominantly from petroleum-based chemicals of bisphenol-A (BPA) and epichlorohydrin.

However, due to dwindling natural resources, associated environmental concerns and, toxicity of the products derived from petroleum resources, there is a growing interest in exploring and utilizing the abundant biomass resources as alternative feedstocks for the production of bio-based chemicals and materials such as BPU foams, BPF foams/resins and, epoxy resins etc. Lignin can also be a suitable precursor for the production of phenolic/epoxy resins because of its aromatic structure. Lignin is expected to replace petroleum-derived polymers/chemicals either partially or completely with/without modification and to have a positive impact on the characteristics of the resulting products. Although with much lower reactivity, even crude lignin can be directly incorporated into PU products, however, more than 30 wt. % incorporation was found to deteriorate the properties of rigid PU foams. Direct utilization of lignin as a green substitute for polyols or phenol/bis-phenol A (BPA) is challenging, especially at economically viable substitution levels, due to lignin's large molecular weight, lower functionality/hydroxyl number, poor solubility in many solvents and lower reactivity towards isocyanate/formaldehyde/epichlorohydrin in the resin synthesis process. Depolymerization of lignin is a viable route for the preparation of low molecular weight products i.e., depolymerized lignins, with higher functionality/hydroxyl number and better reactivity, making them promising feedstocks for the preparation of BPU, BPF and epoxy resin (or foam) materials.

Therefore, it would be highly beneficial to develop novel lignin depolymerization processes.

SUMMARY

In accordance with the present disclosure there is now provided a process for depolymerizing lignin comprising loading a lignin containing source and at least one of a catalyst, a capping agent and a co-solvent into a reactor; heating the reactor to about 150-250° C. to convert the lignin contained in the reactor into depolymerized lignin; and isolating the depolymerized lignin.

In an embodiment, the lignin containing source is a residual pulping chemical, hydrolysis lignins or kraft lignin.

In another embodiment, the residual pulping chemical is black liquor.

In a further embodiment, the hydrolysis lignins are from the TMP-Bio process.

In an embodiment, the catalyst agent is NaOH or white liquor.

In a further embodiment, the capping agent is phenol.

In an additional embodiment, the co-solvent is methanol.

In an embodiment, the process described herein further comprises loading sodium hydrosulphide into the reactor.

In a further embodiment, the reactor is heated at 170° C.

In another embodiment, the depolymerized lignin is isolated by acid precipitation, coagulation, filtration and washing.

In another embodiment, the acid precipitation is with carbon dioxide.

In an additional embodiment, the acid precipitation is with sulfuric acid.

In a further embodiment, wherein the depolymerized lignin is precipitated at pH 9-10.

In another embodiment, the depolymerized lignin is precipitated at pH 2-3.

In another embodiment, the depolymerized lignin and solids residue are purified by filtration to remove residual reaction chemicals followed by washing with at least one of sulphuric acid and water.

In another embodiment, the process described herein further comprises solubilizing the lignin in acetone to separate the lignin from the solids residue followed by removal of the acetone by vacuum distillation and drying to produce solid depolymerized kraft lignin.

In another embodiment, the depolymerized kraft lignin has a molecular weight of about 1200 Dalton to the initial molecular weight of the lignin.

In another embodiment, the process described herein further comprises the step of oxidizing the residual chemicals in the lignin-containing source with an oxidizing agent at a temperature effective for oxidation of sulphide to thiosulphate and other oxidized sulphur compounds, carbohydrates to acidifying agents selected from isosaccharinic acids, acetic acid, formic acid, lactic acid, oxalic acid, carbon dioxide and lignin to acidic lignin degradation products and mixtures thereof, generating heat through said oxidation, the generated heat leading to the creation of nucleation sites for the formation of lignin particles through lignin colloid agglomeration and coagulation, of a size easy to filter and wash.

In another embodiment, the oxidizing agent is oxygen.

BRIEF DESCRIPTION OF THE DRAWINGS

Reference will now be made to the accompanying drawings.

It will be noted that throughout the appended drawings, like features are identified by like reference numerals.

DETAILED DESCRIPTION

It is provided a process of depolymerizing lignin in black liquor.

Accordingly, it is provided a process for depolymerizing lignin in black liquor comprising loading the black liquor and at least one of a catalyst or a capping agent into a reactor; heating the reactor to about 150-250° C. to depolymerize the lignin contained in the black liquor, producing a solid cake comprising depolymerized lignin and solid residues after acidification of the reaction products; and purifying the depolymerized lignin by removing the solid residues.

Black liquor is the waste product from the kraft process when digesting pulpwood into paper pulp removing lignin, hemicelluloses and other extractives from the wood to free the cellulose fibers.

White liquor is a strongly alkaline solution mainly of sodium hydroxide and sodium hydrosulfide. It is used in the first stage of the kraft process in which lignin and hemicellulose are separated from cellulose fiber for the production of pulp. The white liquor helps break the bonds between lignin and cellulose.

Figure 1:
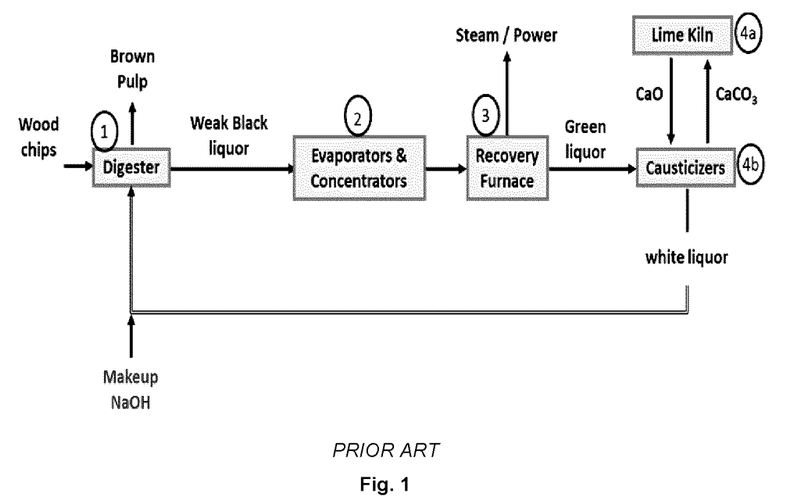
FIG. 1 illustrates a schematic representation of a simplified kraft pulp mill chemical recovery process known in the art.

As shown in FIG. 1, at kraft pulp mills, wood chips are cooked in digesters 1 at high temperature and pressure (about 170° C. and 700 kPa, respectively) with white liquor (a mixture of sodium hydroxide and sodium hydrosulphide) which is produced in the mill's causticizing plant (4a and 4b) in order to break down and remove lignin from the wood chips.

Using this process, fibers composed mostly of cellulose and hemicellulose are produced in the form of brown pulp which is further bleached, dried and sold to market for the manufacture of various paper products. The lignin removed from the wood chips during the pulping and subsequent pulp washing processes, ends up in the residual pulping liquor (weak black liquor) which is concentrated from about 15-20% solids to about 70-80% solids using the multiple-effect evaporators and concentrators 2. The concentrated black liquor is then fed to the recovery furnace 3 where the organics in black liquor are combusted thereby producing carbon dioxide, water and heat. The heat produced in the recovery furnace is used to produce steam and power for internal mill use. During the combustion process, the inorganics in black liquor are converted to sodium carbonate and sodium sulphide which come out from the bottom of the recovery furnace in the form of molten smelt. This smelt is dissolved in water (or other aqueous mill streams) to form green liquor (a solution of sodium carbonate and sodium sulphide). The latter is then converted to white liquor (a solution of sodium hydroxide and sodium sulphide) through the addition of calcium oxide from the lime kiln 4a in the mill's causticizers 4b. A by-product of this reaction is calcium carbonate which is sent back to the lime kiln 4a for re-conversion to calcium oxide by calcining at high temperatures. White liquor is thus produced for reuse in the wood chip pulping process 1. Using this chemical recovery process, over 95% of the chemicals needed in pulping are recovered. A small amount of process chemicals is lost during pulp washing (carried over to the bleach plant with the pulp) and as a result of other losses from the kraft recovery cycle such as spills and leaks from different pieces of equipment as well as the dregs and grits being directed to landfill. The lost sodium and sulphur values are usually made up through the addition to the chemical recovery cycle of purchased sodium hydroxide and sodium sulphate by-product from the mill's chlorine dioxide generator. A typical 1000 ton/d kraft pulp mill adds 10-20 ton/d of sodium hydroxide and about 20-40 ton/d of sodium sulphate as make-up chemicals to the chemical recovery cycle. The exact amounts to be added is determined based on the tightness of the chemical recovery cycle with respect to liquor losses while the ratio of the two make-up chemicals is based on the Na/S ratio in the mill's white liquor which is usually kept constant.

Figure 2:
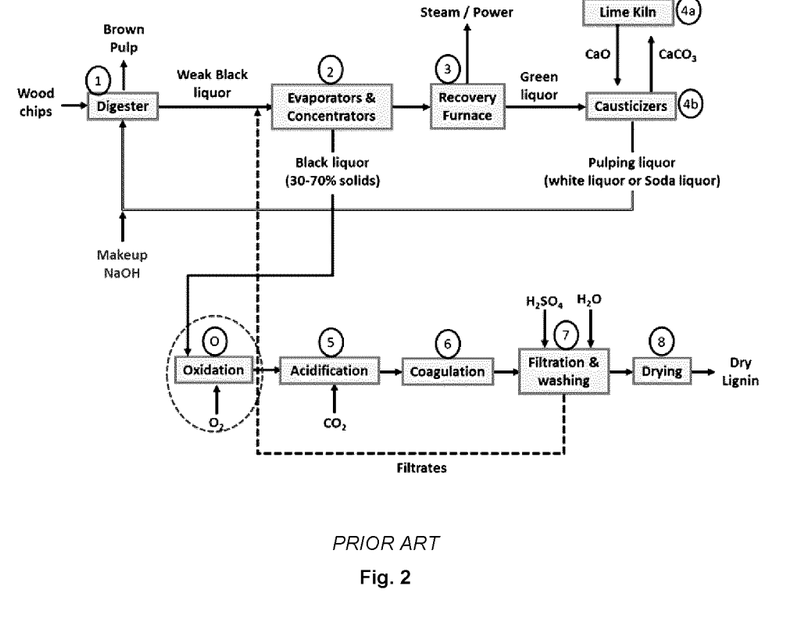
FIG. 2 illustrates a schematic representation of a kraft chemical recovery process incorporating the known LignoForce™ system for the recovery of lignin from black liquor.

In the case of mills that are recovery boiler limited with respect to pulp production and/or wish to produce lignin as a value-added product, the option exists of recovering lignin from a portion of the black liquor flow using any one of three commercially available processes: the Mead-Westvaco™ process, the LignoBoost™ process and the LignoForce™ process. As shown in FIG. 2, in the case of all three of these processes, black liquor is acidified using carbon dioxide 5 to pH 9-10 for lignin to come out of solution in the form of colloidal particles, followed by a coagulation step 6 for lignin particles to grow to larger particles. Such particles filter and wash well in the subsequent filtration and washing steps 7. Lignin can then be dried using a spray dryer or a flash dryer 8. One distinguishing feature of the Ligno-Force™ process, disclosed in U.S. Pat. No. 8,771,464 incorporated herein in its entirety, compared to the other two lignin recovery processes is that it employs a black liquor oxidation step O prior to the black liquor acidification step. This step leads to three important advantages:
  a) it converts malodorous sulphur compounds in black liquor to non-volatile compounds;
  b) it reduces the amount of carbon dioxide and sulphuric acid needed in the subsequent black liquor acidification and lignin washing steps, respectively; and
  c) it helps increase lignin cake filtration rates during the lignin dewatering and washing steps.

During the lignin washing process, sulphuric acid is used followed by a water wash 7. In this process, the sulphuric acid reacts with sodium ligninates (sodium cations associated with the phenolic and carboxyl groups in lignin) and sodium bicarbonate to convert them to sodium sulphate which ends up in the kraft recovery cycle via the filtrate from the lignin dewatering and washing steps. Since sodium ligninates and carbonates would have been converted to sodium hydroxide if they had not been exposed to sulphuric acid, the sodium hydroxide requirements of mills with lignin plants increase to an extent largely determined by the amount of sulphuric acid used in the lignin-washing process.

Even though the lignin product from the above processes can be used in several applications (e.g. phenolic resins, polyurethane foams, thermoplastics and composites, dispersants and flocculants) the range of applications as well as the lignin substitution rates in these applications is limited because of the high lignin molecular weight, Mw (especially in the case of softwood lignins). Softwood lignins have an Mw of about 7,000-15,000 Dalton (as measured by GPC-UV with polystyrene standards). In particular, the high molecular weight and condensed structure of softwood kraft lignins, lead to:
  a) low solubility in various reaction media (e.g. petroleum-based polyols used in the manufacture of PU foams);
  b) low reactivity towards active reagents used in various applications (e.g. isocyanate for making PU foams); and
  c) high viscosity of reaction media (e.g. lignin-polyol reaction mixture for reaction with isocyanate to make PU foams).

As a result, softwood lignin cannot be used at all in certain applications (e.g. as a replacement of bisphenol A in epoxy resins) while in the applications where lignin can be used, the lignin substitution rate is low (e.g. 30-40% phenol replacement in phenolic resins for wood products, 20-30% polyol replacement in PU foams).

As discussed herein, most of the known processes reported for depolymerization of lignin suffer from several drawbacks. The substrate is kraft lignin (not black liquor) which means that the lignin must be re-dissolved in a solvent, depolymerized and recovered again using a lignin recovery process such as LignoForce™. This inevitably leads to significantly higher capital and operating costs associated with depolymerized lignin recovery. Described processes in the art employ a very high temperature and pressure in the lignin depolymerization step—this inevitably leads to high energy costs and more expensive reactor materials. Further, they employ expensive organic solvents—this inevitably leads to high operating costs even if these solvents are mostly recovered. In addition, working with organic solvents requires that special attention be paid to gasket and seal materials as well as health, safety and regulatory issues. The lignin product contains high amounts of carbonized materials—this inevitably leads to limited lignin applications or additional steps are required for the purification of lignin (e.g. acetone extraction and recovery).

To avoid the problems of the prior art, it is preferable that the lignin is depolymerized in black liquor before the latter is introduced into a lignin recovery system (e.g. Ligno-Force™) for the production of purified lignin. One such process was recently developed by Hannus et al. (U.S. Pat. No. 9,567,360) in which black liquor is heated at an increased temperature before lignin extraction using conventional lignin precipitation processes. This approach, however, led to a reduction in lignin MW of only 15.8% which is not sufficient to increase the use of lignin to any significant extent in most known applications (e.g. phenolic resins, polyurethane foams, and epoxy resins). On the contrary, a lignin depolymerization process is described herein in which lignin is depolymerized in black liquor to a weight average molecular weight (Mw) which is more than 30% lower than the initial lignin Mw. This surprising result was obtained by reacting lignin in black liquor with chemicals mostly available at the mill site (e.g. sodium hydroxide, methanol) or made at the mill site (e.g. white liquor) and which are compatible with common lignin recovery processes (e.g. LignoForce™) and the kraft mill recovery cycle.

Figure 3:
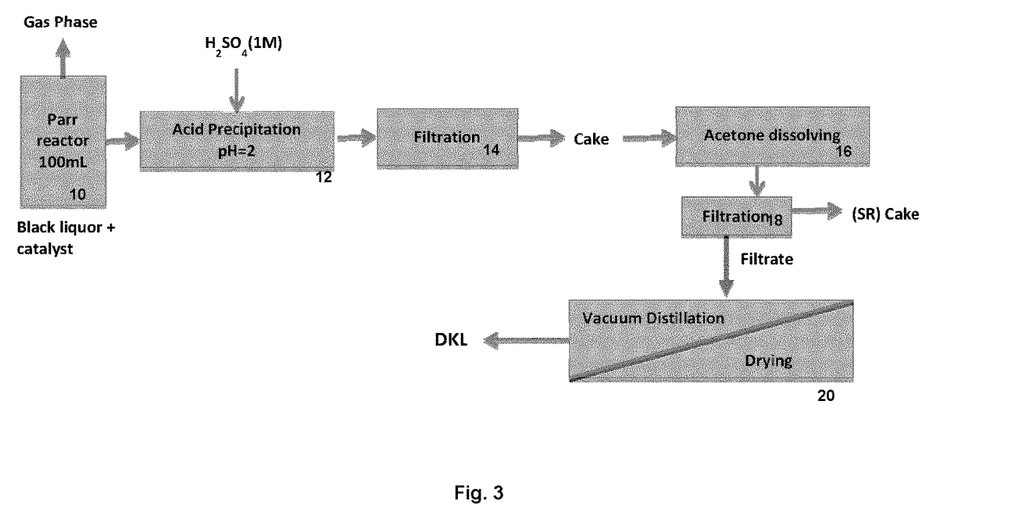
FIG. 3 illustrates a schematic representation of a process of depolymerization of lignin contained in black liquor according to one embodiment as described herein.

As depicted in FIG. 3, the depolymerization process described herein comprises the steps of loading the black liquor into a reactor 10 with a catalyst such as NaOH or white liquor. A capping agent such as phenol or a co-solvent such as methanol can be added in addition to the catalyst or without the catalyst. In an embodiment, the depolymerized lignin is further precipitated 12 at pH 9-10 by addition of carbon dioxide or at pH 2 by addition of a mineral acid such as sulfuric acid. The precipitated depolymerized lignin in a solid form is filtered 14 and, optionally dissolved 16 in acetone to remove solid residue contained in the precipitated cake, if any. In the latter case, after filtration 18, the depolymerized lignin is purified 20 from any remaining acetone by vacuum distillation to finally produce dry depolymerized kraft lignin in the solid form.

For example, it is disclosed here that when sodium hydroxide was added to black liquor at a 0.35:1 (w/w)

NaOH to lignin ratio, and the liquor was cooked at 170° C. for 1 hour, the kraft lignin molecular weight was reduced from 7,130 Dalton to 3292-3474 Dalton. Furthermore, when the capping agent, phenol was added to the mix at a 1% charge (on a dry weight basis with respect to lignin in black liquor), the lignin Mw was reduced to 1,200 Dalton. Similarly, when the co-solvent, methanol was added at a 5% charge (on a dry weight basis with respect to the lignin in black liquor), the Mw dropped to 2,340 Dalton in the absence of any sodium hydroxide addition and to 1,500 Dalton after addition of sodium hydroxide along with the methanol.

Figure 4:
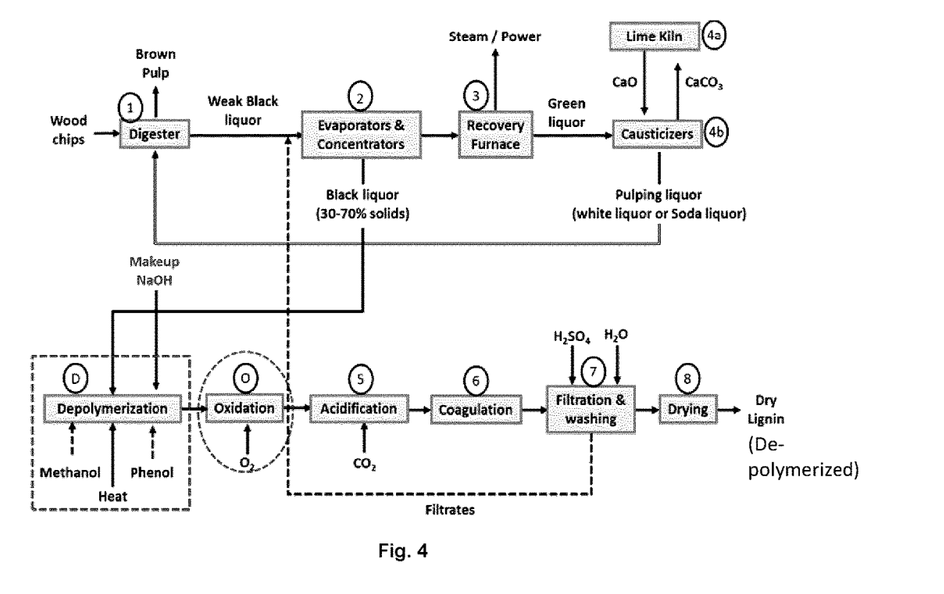
FIG. 4 illustrates the lignin depolymerization process according to one embodiment integrated into a pulp mill operation.

The integration of the above lignin depolymerization process into kraft pulp mills with an installed lignin recovery process is illustrated in FIG. 4. As shown FIG. 4, black liquor from the mill's evaporators and concentrators is fed to a reactor D in which sodium hydroxide is added in the presence or absence of a capping agent or co-solvent (e.g. phenol or methanol). After reaction at about 170-250° C. for 1-2 hours, the treated black liquor is fed to the lignin recovery system for the production of depolymerized lignin. In particular, of the main commercial lignin recovery processes, the LignoForce™ process is preferred because it incorporates a black liquor oxidation step ahead of the black liquor acidification step. As mentioned above, in this case, the oxidation of sulphur compounds, carbohydrates and low MW lignin in black liquor consumes residual alkali leading to reduced chemical consumption (carbon dioxide, sulfuric acid and sodium hydroxide) in the subsequent process steps (black liquor acidification, lignin washing and caustic make-up addition to the kraft recovery cycle).

The sodium hydroxide added to the depolymerization reactor cannot exceed the sodium hydroxide make-up requirements of any given mill, otherwise, it will lead to a sodium/sulphur imbalance problem in the mill's white liquor. For example, if a mill uses in the depolymerization reactor a sodium hydroxide to lignin ratio in black liquor of 0.3 to 1 (on a dry weight basis) and this mill has a sodium hydroxide make-up requirement of 15 ton/d, then the maximum amount of depolymerized lignin that this mill could produce would be 50 ton/d.

To enable kraft pulp mills to produce depolymerized lignin at a production level that exceeds the limit imposed by their sodium hydroxide make-up requirements, one must use internally produced sodium hydroxide. Such sodium hydroxide is produced at all kraft pulp mills in the form of white liquor which is a mixture of sodium hydroxide and sodium hydrosulphide (see FIG. 1). When white liquor was used for this purpose, it was possible to depolymerize kraft lignin in black liquor from an initial Mw of 7,130 Dalton to about 3177-3518 Dalton at a ratio of 1:4 WL to BL (v/v), at 170° C. for 1 hr and to 2,640 Dalton at a ratio of 1:2 WL to BL (v/v) at 190° C. for 1 hr.

Figure 5:
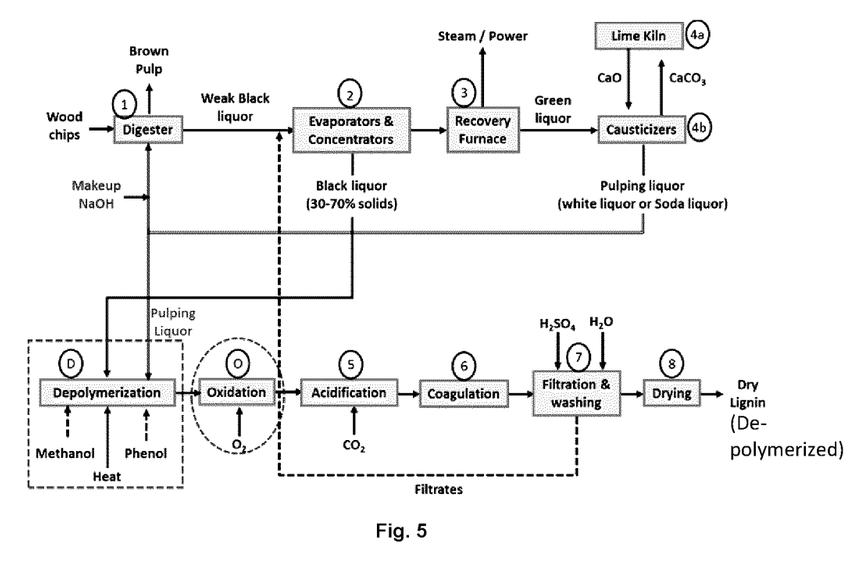
FIG. 5 illustrates the lignin depolymerization process according to one embodiment integrated into kraft pulp mill operations.

The integration of the above lignin depolymerization process into kraft pulp mills with an installed lignin recovery process is illustrated in FIG. 5. As shown, black liquor from the mill's evaporators and concentrators is fed to a reactor D in which white liquor is added in the presence or absence of a capping agent (e.g. phenol) or co-solvent (e.g. methanol). After reaction at about 170-250° C. for 1-2 hours, the treated black liquor is fed to the lignin recovery system for the production of depolymerized lignin.

In particular, of the main commercial lignin recovery processes, the LignoForce™ process is preferred because it incorporates a black liquor oxidation step ahead of the black liquor acidification step. As mentioned above, in this case, the oxidation of sulphur compounds, carbohydrates and low molecular weight lignin in black liquor consumes residual alkali leading to reduced chemical consumption (carbon dioxide, sulphuric acid and sodium hydroxide) in the subsequent process steps (black liquor acidification, lignin washing and caustic make-up addition to the kraft recovery cycle). Since white liquor contains significant amounts of hydrosulphide, it is particularly important to feed the treated black liquor to a lignin recovery system such as LignoForce™ which incorporates a black liquor oxidation step for the purpose of oxidizing all excess hydrosulphide to thiosulphate and sulphate in order to avoid the generation of hydrogen sulphide in all subsequent acidification and washing steps.

Accordingly, it is also encompassed herein that the depolymerized lignin produced by the process described herein be further processed using the LignoForce™ process (see U.S. Pat. No. 8,771,464). The depolymerized lignin can be further processed by oxidizing with an oxidizing agent consisting essentially of oxygen prior to acidifying at a temperature effective for oxidation to thiosulphate and other oxidized sulphur compounds and oxidation of the thiosulphate to sulphate contained in the depolymerized lignin, and such that hemicelluloses and other organics are oxidized by the oxidizing agent at the temperature to form an acidifying agent selected from isosaccharinic acids, acetic acid, formic acid, lactic acid, oxalic acid, carbon dioxide and acidic lignin degradation products and mixtures thereof, with generation of heat through the said oxidation, the generated heat leading to the creation of nucleation sites for the formation of lignin particles through lignin colloid agglomeration and coagulation, of a size easy to filter and wash, the acidifying agent reducing the acidifier requirement for the acidifying.

Also encompassed herein is the process comprising the step of oxidizing the lignin containing source and the catalyst, the capping agent and/or the co-solvent in the reactor with an oxidizing agent, consisting essentially of oxygen prior to acidifying at a temperature effective for oxidation of sulphide to thiosulphate and other oxidized sulphur compounds and such that hemicelluloses and other organics are oxidized by the oxidizing agent at the temperature to form an acidifying agent selected from isosaccharinic acids, acetic acid, formic acid, lactic acid, oxalic acid, carbon dioxide, acidic lignin degradation products and mixtures thereof, with generation of heat through the oxidation, the generated heat leading to the creation of nucleation sites for the formation of lignin particles through lignin colloid agglomeration and coagulation, of a size easy to filter and wash, the acidifying agent reducing the acidifier requirement for the acidifying.

As mentioned before, hydrolysis lignins (HL) are a byproduct from acid or enzymatic biomass pretreatment processes such as the ones employed in cellulosic sugar and/or ethanol plants. They are mainly composed of lignin (50-65 wt. %), unreacted cellulose and mono and oligosaccharides. These lignins are, to a large extent, covalently bonded to cellulose and/or hemicellulose to form lignin carbohydrate complexes (LCCs) thereby making them insoluble in alkali and most common organic solvents—this, obviously, limits significantly the range of applications in which they can be used. Using the lignin depolymerization approach described herein, hydrolysis lignins were surprisingly depolymerize as well. In fact, by immersing these lignins in either sodium hydroxide or white liquor, preferably at kraft pulp mills, and by heating the reaction mixture at temperatures ranging from 170 to 250° C., not only was it possible to break ether bonds within the lignin component of these materials but also lignin-carbohydrate bonds. This approach enabled to produce lignins of a significantly lower carbohydrate content, a significantly lower MW and a solubility properties comparable to soda and kraft lignins.

Example 1

Reaction of Lignin in Black Liquor in the Presence of Added Sodium Hydroxide Using black liquor (BL) as the reaction substrate, a set of experiments was conducted under pre-selected conditions at temperatures ranging from 200-350° C. and reaction times ranging from 0.5-3 hours. The experiments were carried out in a 100-mL Parr reactor (Model 4848). A typical run employed 50 g BL (27.9 wt % solids content), under $N_2$ at 2 MPa (initial pressure). The BL was initially charged into the reactor and the reactor was then sealed. The reactor was first vacuum-purged for 2-3 times with $N_2$ in order to ensure the complete removal of any air or oxygen present inside the reactor. Subsequently, the reactor was pressurized with $N_2$ to a pressure of 2 MPa and a leak test was conducted. The reactor was then heated up at a heating rate of about 5° C./min under 300 rpm stirring. The reaction time was recorded from the point at which the target temperature was reached.

After completion of the reaction, the reactor was rapidly cooled in icy water to stop further reactions. The reaction products were then acidified to pH=2 using sulfuric acid thereby inducing the lignin to come out of solution in the form of suspended colloidal particles. After allowing the lignin particles to coagulate to larger particles, the slurry was filtered to produce a lignin cake and a filtrate. Subsequently, the cake was optionally dissolved in acetone and the solution filtered in order to remove any undissolved material which was mainly composed of carbon-based solid residual (SR) materials. The acetone was then removed from the lignin acetone solution using vacuum distillation. The purified, dry depolymerized lignin product was then tested for various properties including molecular weight distribution. The latter was measured after acetobromination of the lignin and injection of a small volume of acetobrominated lignin in THF into an organic phase size exclusion chromatography (SEC) system with on-line refractive index (RI) and UV detectors as described in Baumberger, S. et al., Molar Mass Determination of Lignins by Size-Exclusion Chromatography: Towards Standardisation of the Method", Holzforschung, 61:459-468 (2007).

1-Effect of Temperature on Lignin $M_w$ and Reaction Yield

In order to evaluate the effect of temperature on lignin MW and yield, black liquor and sodium hydroxide were added to the Parr reactor described above and the reactor was heated to various temperatures in the 200-350° C. range to depolymerize the lignin contained in the black liquor. The experimental conditions in this experiment were as follows: NaOH/lignin ratio of 0.3:1 (w/w), black liquor substrate containing 13 wt % lignin, reaction time of 1 hour. The reaction products were then processed to produce dry depolymerized lignin as also described above. The purified, dry lignin product was then tested for various properties including molecular weight distribution.

Figure 6A:
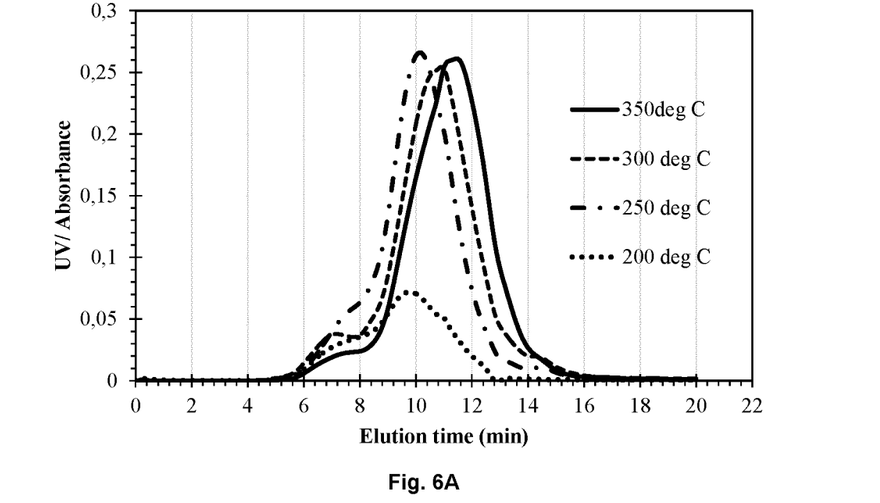
FIG. 6 illustrates the effect of the temperature of the depolymerization reaction of the process described herein on lignin molecular weight (A) and yield (B).
Figure 6B:
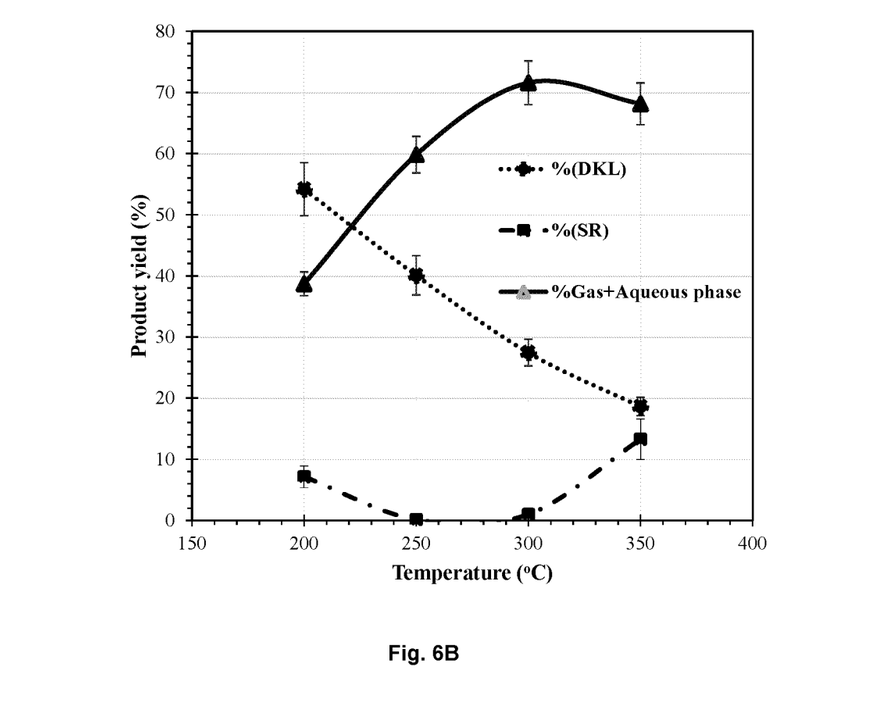

As clearly shown in FIG. 6 A, an increase in the reaction temperature from 200 to 350° C. led to a shift in the molecular weight distribution to the right in the chromatogram obtained by injecting a THF solution of this lignin into a GPC system i.e., it moved towards a lower weight-average molecular weight (Mw). It appears that, under the conditions of this reaction, the hydrolysis of lignin ether bonds was further promoted at higher temperatures. FIG. 6B, displays the effects of reaction temperature in the 200-350° C. range on the yields obtained for depolymerized kraft lignin (DKL), solid residue (SR) and products in the gas and aqueous phases. As seen, the reaction yields for depolymerized lignin decreases with increasing temperature. Hence, the optimum temperature range in terms of achieving a reasonably high degree of depolymerization while maintaining a reasonably high reaction yield appears to be between 200-250° C.

2-Effect of Reaction Time on Lignin $M_w$ and Reaction Yield

Figure 7A:
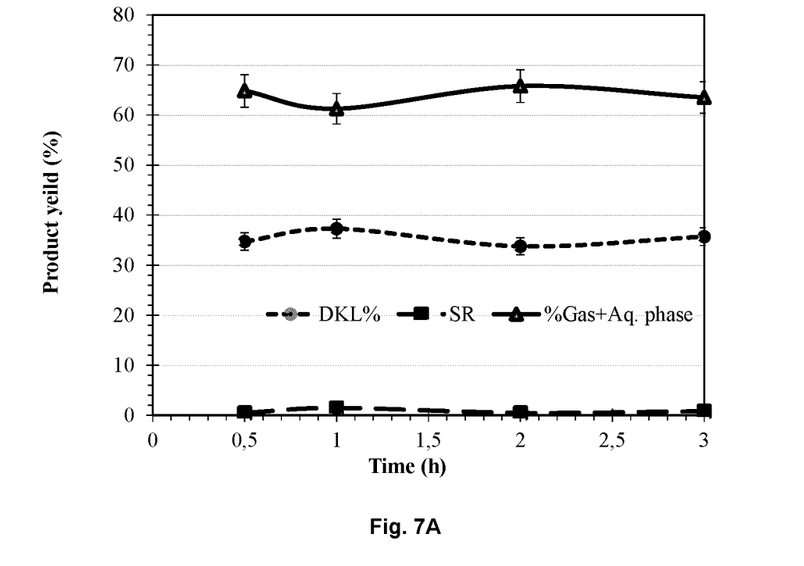
FIG. 7 illustrates the effect of the reaction time of the process described herein on lignin yield (A) and molecular weight (B).
Figure 7B:
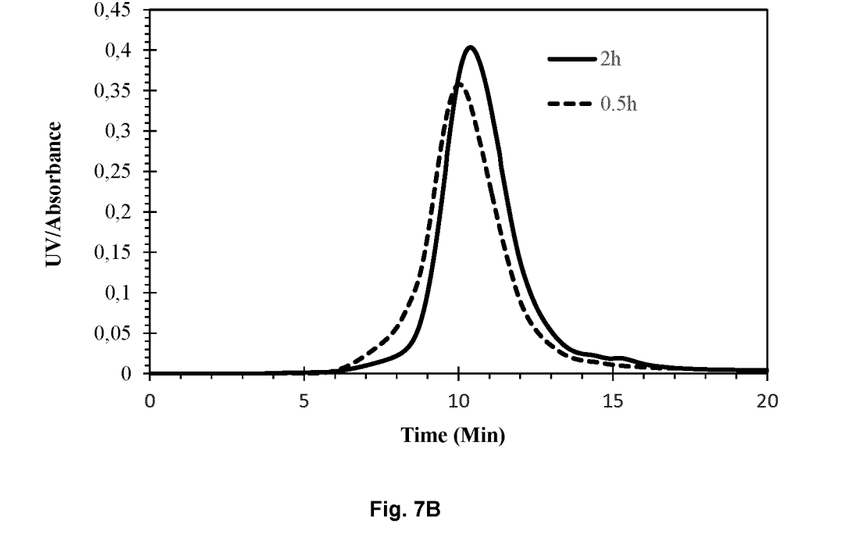

In order to evaluate the effect of reaction time on lignin MW and yield, black liquor and sodium hydroxide were added to the Parr reactor described above and the reactor was heated to 250° C. to depolymerize the lignin contained in the black liquor. In these experiments the NaOH/lignin ratio was 0.3:1 (w/w), the black liquor substrate contained 13 wt % lignin and the reaction time was varied from 0.5 to 3 hours. FIG. 7A shows the effect of reaction time on yields of DKL, SR and (Gas+Aqueous phase). At 250° C., there was a slight decrease in DKL average yield (%) and a slight increase in SR average yield (%) with increasing reaction time. FIG. 7B illustrates the effect of reaction time on molecular weight distribution of DKLs for two different reaction times (0.5 h and 2 h). As seen, the GPC-UV signal shifted toward lower molecular weights in the case of the longer reaction time.

3-Effect of Lignin Concentration on Lignin $M_w$

Figure 8:
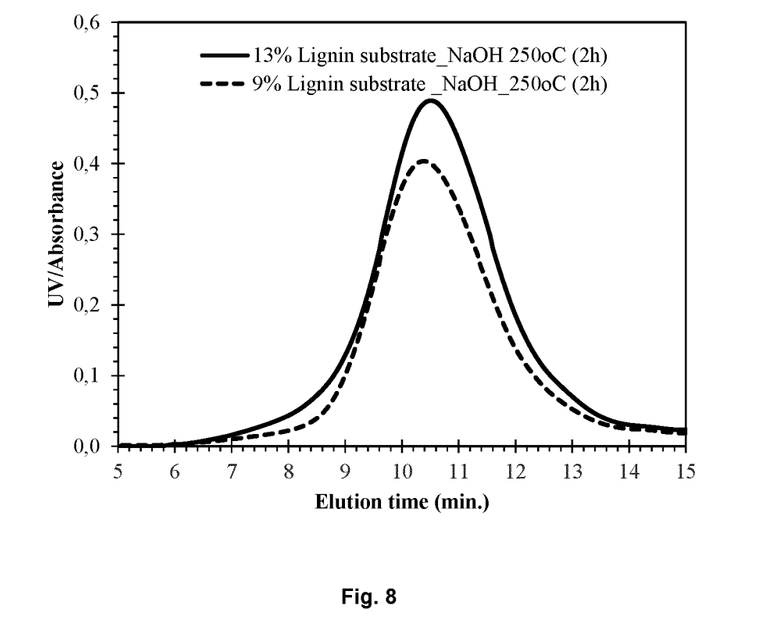
FIG. 8 illustrates the effect of the starting lignin concentration using the process described herein on resulting lignin molecular weight.

In order to evaluate the effect of lignin concentration on lignin MW, black liquor and sodium hydroxide were added to the Parr reactor described above and the reactor was heated to 250° C. to depolymerize the lignin contained in the black liquor. In these experiments, the NaOH/lignin ratio was 0.3:1 (w/w), the reaction time was 2 hours and the black liquor substrate was diluted from 13 wt % to 9 wt % lignin concentration. The effect of lignin concentration in black liquor on lignin MW is seen in FIG. 8. As seen, the average molecular weight declined when the concentration was reduced, suggesting that diluting black liquor with more water facilitated the hydrolytic splitting of β-O-4 ether linkages, likely because water dilution enhanced the accessibility of the lignin molecules.

4-Effect of Capping Agent on Lignin $M_w$ and Yield

The conditions used in this experiment were as follows: lignin concentration in black liquor: 9 wt %, catalyst NaOH/lignin ratio=0.3:1 (w/w), phenol concentration: 0-5 wt. % (on a dry lignin basis), temperature: 250° C. and reaction time: 2 h. The procedure used for DKL recovery and purification is the same as described above.

As shown in Table 1, following the addition of a capping agent such as phenol at a 1 wt % charge, in the absence of added sodium hydroxide, the molecular weight of the DKL dropped from 7050 Dalton to 1200 Dalton. Furthermore, the polydispersity index, which is a measure of the tightness of the molecular weight distribution improved significantly as well by changing from 14.6 to 1.9 while lignin yield declined from 33.1% to 29.2 wt %. The yield for solid residues production slightly increased from 0.40 to 0.63 wt %. An increase in phenol charge to 5 wt % did not lead to any further change in lignin MW, polydispersity index or yield. The yield for solid residues, however, declined to 0.16%.

TABLE 1

Effect of phenol on MW, polydispersity and
product yield of depolymerized lignin

| Capping agent (wt % w.r.t. lignin) | Yield (wt %)[a] | | Molecular weight of DKL by GPC-UV | | |
|---|---|---|---|---|---|
| | DKL | SR | $M_w$ (g/mol) | $M_n$ (g/mol) | PDI[b] |
| 0 | 33.1 | 0.40 | 7050 | 480 | 14.6 |
| 1 | 29.2 | 0.63 | 1200 | 622 | 1.9 |
| 2 | 29.1 | 0.16 | 1170 | 560 | 2.1 |
| 5 | 30.5 | 0.16 | 1185 | 599 | 2.0 |
| Kraft Lignin | — | — | 10000 | 5000 | 2.0 |

5-Effect of Co-Solvent on Lignin $M_w$

The conditions used in this experiment were as follows: lignin concentration: 13 wt %, temperature: 250° C., NaOH/lignin ratio=0.3:1 (w/w), reaction time: 2 h and methanol concentration: 5% (based on lignin content in black liquor). The procedure used for DKL recovery and purification is as described above.

As shown in Table 2, following the addition of a co-solvent such as methanol at a 5 wt % charge, in the absence of added sodium hydroxide, the molecular weight of the DKL dropped from 7050 Dalton to 2340 Dalton. Furthermore, the polydispersity index improved significantly as well by changing from 14.6 to 3.5 while lignin yield actually increased from 30.1% to 42.92%. The yield for solid residues decreased from 0.4 to 0.3%. The addition of 30 wt % sodium hydroxide catalyst (on a dry lignin basis), reduced the lignin MW to 1500 Dalton and the polydispersity index to 2.3. The lignin yield, however, dropped to 32.1% while the solids residues yield increased to 0.6%.

TABLE 2

Effect of methanol on product yield, MW and
polydispersity of depolymerized lignin

| Co-solvent (wt % w.r.t. lignin) | Cat. lignin ratio (w/w) | Yield (wt %)[a] | | Molecular weight of DKL by GPC-UV | | |
|---|---|---|---|---|---|---|
| | | DKL | SR | $M_w$ (g/mol) | $M_n$ (g/mol) | PDI[b] (—) |
| 0 | 0.3 | 30.1 | 0.4 | 7050 | 480 | 14.6 |
| 5 | 0 | 42.9 | 0.3 | 2340 | 660 | 3.5 |
| 5 | 0.3 | 32.1 | 0.6 | 1500 | 650 | 2.3 |
| Kraft Lignin | | | | 10000 | 5000 | 2 |

Example 2

Depolymerization of Lignin in Black Liquor in the Presence of Added White Liquor Using black liquor as the reaction substrate, a set of experiments were conducted in a batch 2 L Parr Model 4843 reactor, equipped with a pressure gauge, thermocouple, stirrer, gas lines (in and out) and sampling line. In a typical run, 500 mL of black liquor and 250 mL of white liquor (2:1(v/v)) were charged to the reactor. The reactor was then closed and tightened. The reactor was purged with $N_2$ 2-3 times to ensure the complete removal of any air or oxygen present inside the enclosed reactor. Subsequently, the reactor was pressurized with $N_2$ to 2 bar (cold pressure), then a leak test was performed. The reactor was then heated up under stirring (670 rpm), and allowed to run over a pre-specified length of reaction time (1 hour) after the reactor reached the required temperature. Once the pre-determined reaction time was reached, the reactor was immediately quenched with cold water to stop further reaction. When the system reached nearly room temperature, all the reactor contents were collected and acidified using 1M $H_2SO_4$ to pH=2, in order to precipitate out the DKL. The liquid/solid mixture was then separated by filtration. Subsequently, the solid lignin cake was washed in three stages using: (a) 2 liters of 0.4N $H_2SO_4$, (b) 2 liters of 0.01N H2SO4 and (c) 2 liters of distilled water. All the washing filtrates were collected for further analysis. The white liquor used had a density of 1.102 g/mL, an $Na_2O$ concentration of 85 g/L and a sodium sulphide content of 35 g/L.

Figure 9:
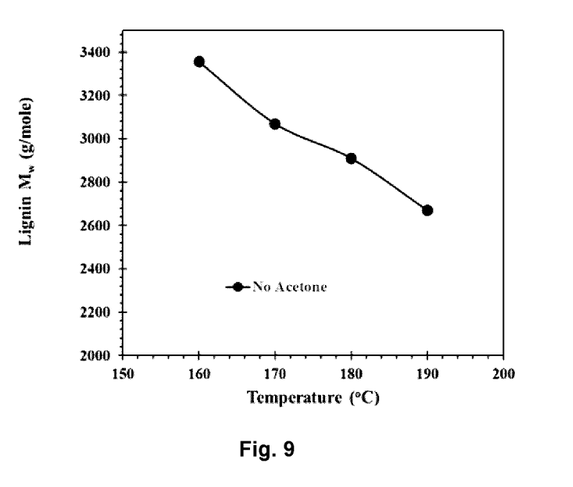
FIG. 9 illustrates the effect of temperature on lignin depolymerization from black liquor treatment with white liquor as encompassed herein.

FIG. 9 displays the effect of temperature on the Mw of the lignin recovered in the temperature range of 160-190° C. after a reaction time of 1 h. As shown, the Mw of DKL decreases with increasing temperature, suggesting that ether bond cleavage reactions due to the nucleophilic attack of hydrosulphide ions are enhanced with increasing temperature. In particular, the Mw dropped from 7130 g/mole (original lignin) to <3000 g/mole at 190° C. The DKL % yield for the temperature range between 160-190° C. remained unchanged at about 60 wt %. No solid residue was produced in this range of temperatures.

Figure 10:
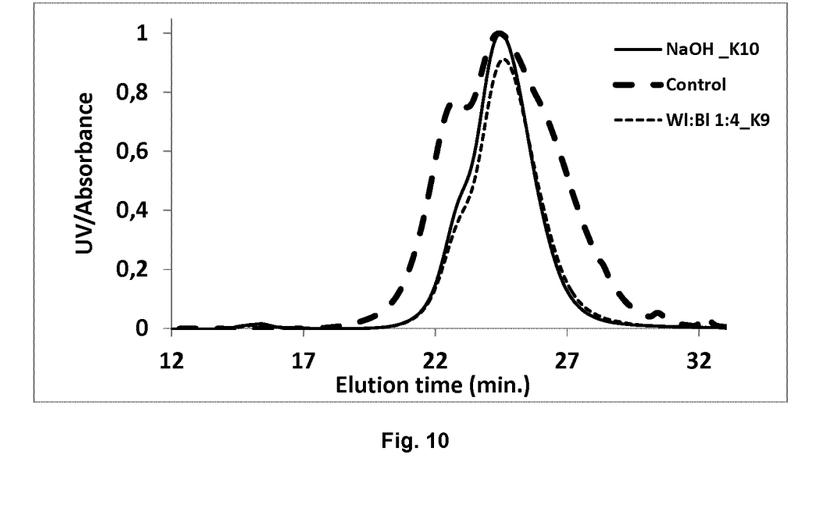
FIG. 10 compares the effect of NaOH treatment vs white liquor treatment of black liquor on lignin depolymerization as encompassed herein.

FIG. 10 compares the lignin molecular weight distribution obtained following black liquor treatment with NaOH vs White liquor under pulping conditions. In the experiment in which sodium hydroxide was used as a catalyst, 750 mL of 36.3% solids BL was used plus 55 mL of NaOH (761 g/L); NaOH/Lignin ratio: 0.35:1 (v/v), Temp.: 170° C., Reaction time: 1 hr (K10). In the case of the experiment in which white liquor was used as the catalyst, 500 mL of 36.3% solids BL (Hinton) was used at a WL/BL ratio of 1:4 (v/v), Temp.: 170° C., Reaction time: 1 hr (K9). As shown in FIG. 10, both molecular weight distributions (K10 and K9) were shifted toward lower Mw compared to the original lignin (control signal). It was possible to depolymerize kraft lignin in black liquor from an initial Mw of 7,130 Dalton to about 3177-3518 Dalton in both cases.

Example 3

Depolymerization of Hydrolysis Lignin in the Presence of Added NaOH or White Liquor The depolymerization of hydrolysis lignin (HL) was carried out in a batch 2-L Parr Model 4843 reactor, equipped with a pressure gauge, thermocouple, stirrer, gas lines (in and out) and a sampling line. The HL used in this study was produced at FPlnnovations using its proprietary TMP-Bio process and washed with water before use. Two sets of experiments were carried out on the washed HL:
  a) 1-A: in this experiment, the following chemicals were charged to the reactor: 140 g HL, 250 mL white liquor and 500 mL deionized water;
  b) 2-A: in this experiment, the following chemicals were charged to the reactor: 250 g HL, 1300 mL deionized water and (60 mL NaOH or 120 mL NaOH).

The reactor was then closed and tightened. The reactor was purged 2-3 times with $N_2$ to ensure the complete removal of any air or oxygen present inside the enclosed reactor. Subsequently, the reactor was pressurized with $N_2$ to cold pressure of 10 bars then a leak test was performed. The reactor was then heated up under stirring (670 rpm), and allowed to run over a pre-specified length of reaction time (1 hour) after the reactor reached the required temperature (in this case 170° C.). Once the pre-determined reaction time was reached, the reactor was immediately quenched with water to stop further reaction. When the system reached nearly room temperature, all the reactor contents were collected and acidified using 1M $H_2SO_4$ to pH=2, in order to precipitate out the depolymerized hydrolysis lignin (DHL). The liquid/solid mixture was then separated by filtration. Subsequently, the solid lignin cake was washed in three stages using: (a) 2 liters of 0.4N $H_2SO_4$, (b) 2 liters of 0.01N $H_2SO_4$ and (c) 2 liters of distilled water. All the washing filtrates were collected for further analysis.

In these experiments, the original washed HL was composed of 60 wt. % lignin, 29.8 wt. % carbohydrates, 1.2 wt. % ash and 9 wt. % other materials. The average molecular weight of this lignin was not possible to measure due to its lack of solubility in common organic solvents. As seen in Table 3, when the NaOH/HL mass ratio was increased from 0.23 to 0.42 (D-HL_1, D-HL_2), the Mw decreased dramatically from 7457 Dalton (fraction of lignin that is soluble in THF after acetobromination) to 3378 and 2145 Dalton, respectively. Furthermore, at the higher sodium hydroxide charge (D-HL_2 sample), the polydispersity index (PDI) dropped from 2.9 to 2.0 while the yield dropped from 71% to 67%. It should be understood here that the NaOH charge is expressed here in the form of $Na_2O$, as is usually the case in kraft pulping.

TABLE 3

Effect of NaOH or white liquor on lignin MW, polydispersity and yield

| Sample # | | T | HL/DW* (g/g) | NaOH/HL (g/g) | UV (g/mole) | | | |
|---|---|---|---|---|---|---|---|---|
| | | | | | $M_w$ | $M_n$ | PDI | Yield |
| HL-Control | Washed raw HL | | / | | 7457 | 2647 | 2.8 | / |
| D-HL_1 | HL_with DW & NaOH, 1 hr | 170° C. | 0.2 | 0.23 | 3378 | 1179 | 2.9 | 71% |
| D-HL_2 | HL_with DW & NaOH, 1 hr | 170° C. | 0.2 | 0.42 | 2145 | 1068 | 2.0 | 67% |
| D-HL | HL with DW & WL (2:1) (v/v), 1 hr | 170° C. | 0.28 | 0.15 | 2237 | 1045 | 2.1 | 60% |

Figure 11:
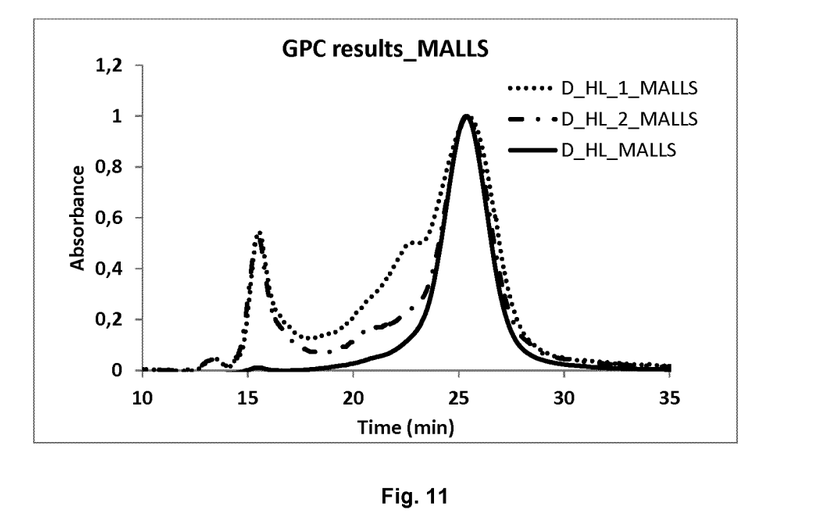
FIG. 11 compares the effect of NaOH treatment vs white liquor treatment of hydrolysis lignin on lignin depolymerization as encompassed herein.

*NaOH concentration: 595 g/L as $Na_2O$; White liquor (WL) composition: EA = 85 g/L (as $Na_2O$), sulfide concentration 35 g/L
*DW: Deionized water For the experiment in which the ($Na_2O$ in WL)/HL ratio=0.15 (D_HL experiment in Table 3), the Mw dropped from 7457 Dalton to 2237 Dalton. This MW is lower than what was obtained when a ratio of ($Na_2O$ in NaOH)/HL=0.23 was used. Hence, this experiment demonstrates that both the OH— and HS— reagents in white liquor are active in facilitating lignin depolymerization reactions (either by breaking ether bonds or by preventing lignin repolymerization). Furthermore, the polydispersity index of the depolymerized lignin obtained when white liquor was used is about 2.14 which are lower than the value obtained when sodium hydroxide of a comparable $Na_2O$ concentration was used (2.87). Furthermore, as shown in FIG. 11, the absorbance signal in the GPC-MALLS chromatogram of the sample that was depolymerized with white liquor (WL_HL) is unimodal while the absorbance signals in the GPC chromatograms of the two samples that were depolymerized with sodium hydroxide (DHL_1 and DHL_2) are bimodal with a shoulder peak appearing before an elution time of 20 min. These shoulder peaks likely correspond to lignin-carbohydrate complexes (LCC), suggesting that white liquor is more effective than NaOH alone in cleaving lignin-carbohydrate bonds in LCC complexes.

While the present disclosure has been described in connection with specific embodiments thereof, it will be understood that it is capable of further modifications and this application is intended to cover any variations, uses, or adaptations, as come within known or customary practice within the art and as may be applied to the essential features hereinbefore set forth, and as follows in the scope of the appended claims.

What is claimed is:

1. A process for depolymerizing lignin comprising:
   a) loading black liquor, a capping agent and a co-solvent into a reactor, wherein the black liquor comprises 15 to 36.3% solids;
   b) adding a catalyst, wherein the catalyst is NaOH or white liquor;
   c) heating the reactor to about 160-190° C. to convert the lignin contained in the reactor into depolymerized lignin; and
   d) isolating the depolymerized lignin, wherein the depolymerized lignin has a molecular weight of from 1170 to 3518 Dalton.

2. The process of claim 1, wherein the capping agent is phenol.

3. The process of claim 1, wherein the co-solvent is methanol.

4. The process of claim 1, comprising further loading sodium hydrosulphide into the reactor.

5. The process of claim 1, wherein the reactor is heated at 170° C.

6. The process of claim 1, wherein the depolymerized lignin is isolated by acid precipitation, coagulation, filtration and washing.

7. The process of claim 6, wherein the acid precipitation is with sulfuric acid.

8. The process of claim 6, wherein the acid precipitation is with carbon dioxide.

9. The process of claim 1, wherein the depolymerized lignin is precipitated at pH 9-10.

10. The process of claim 1, wherein the depolymerized lignin is precipitated at pH 2-3.

11. The process of claim 1, wherein the depolymerized lignin is purified by filtration to remove residual reaction chemicals followed by washing with at least one of sulphuric acid and water.

12. The process of claim 11, further comprising solubilizing the depolymerized lignin in acetone to separate said depolymerized lignin from any solids residue followed by removal of the acetone by vacuum distillation and drying to produce solid depolymerized kraft lignin.

13. The process of claim 11, further comprising the step of oxidizing the residual chemicals from the reaction of step c) in the black liquor with an oxidizing agent at a temperature effective for oxidation of sulphide to thiosulphate and other oxidized sulphur compounds, carbohydrates to acidifying agents selected from isosaccharinic acids, acetic acid, formic acid, lactic acid, oxalic acid, carbon dioxide and lignin to acidic lignin degradation products and mixtures thereof, generating heat through said oxidation, the generated heat leading to the creation of nucleation sites for the formation of lignin particles through lignin colloid agglomeration and coagulation, of a size easy to filter and wash.

14. The process of claim 13, wherein the oxidizing agent is oxygen.

15. The process of claim 1, wherein the depolymerized lignin has a molecular weight of about 1200 Dalton.

* * * * *